United States Patent [19]

Dirks et al.

[11] 3,714,634

[45] Jan. 30, 1973

[54] METHOD AND SYSTEM FOR SORTING WITHOUT COMPARATOR

[75] Inventors: Gerhard Dirks, Los Altos Hills; Paul F. Schenck, Mountain View, both of Calif.

[73] Assignee: Dirks Electronics Corporation, Sunnyvale, Calif.

[22] Filed: Jan. 7, 1971

[21] Appl. No.: 104,658

[52] U.S. Cl. ..................340/172.5

[51] Int. Cl. ..................G06f 7/06

[58] Field of Search ..................340/172.5

[56] References Cited

UNITED STATES PATENTS

| | | | |
|---|---|---|---|
| 2,674,733 | 4/1954 | Robbins | 340/172.5 X |
| 3,034,102 | 5/1962 | Armstrong et al | 340/172.5 |
| 3,183,484 | 5/1965 | Christiansen | 340/172.5 X |
| 3,311,892 | 3/1967 | O'Conner | 340/172.5 |
| 3,336,580 | 8/1967 | Armstrong | 340/172.5 |
| 3,399,383 | 8/1968 | Armstrong | 340/172.5 |

*Primary Examiner*—Paul J. Henon
*Assistant Examiner*—Sydney R. Chirlin
*Attorney*—John L. McGannon, Paul W. Vapnek, Stephen S. Townsend, Ronald S. Laurie, Charles E. Townsend, Donald J. De Geller, Anthony B. Diepenbrock, Albert J. Hillman, Thomas H. Olson, Thomas F. Smegal, Jr., William M. Hynes and Daniel H. Kane

[57] ABSTRACT

Record unit addresses, providing access to corresponding record units having keyfields, are stored in a first storage, each under control of the corresponding least significant keyfield bit. Zero keyfield bits cause storage of record unit addresses in sequential locations following a "0" assigned storage location; "1" keyfield bits cause storage of record unit addresses in sequential locations following a "1" assigned storage location. Record unit addresses in the "0" assigned storage locations of the first storage are then transferred to a second storage in the same manner under control of the next significant keyfield bit. Next, the record unit addresses in the "1" assigned storage locations of the first storage are so transferred to the second storage. The transfers are repeated under control of all keyfield bits, read-out from "0" assigned storage locations always preceding read-out from "1" assigned storage locations.

44 Claims, 8 Drawing Figures

Patented Jan. 30, 1973 | 3,714,634

8 Sheets-Sheet 1

TABLE 1A

| | COLUMNS 1 | 2 | 3 | 4 | 5 | 6 | 7 | 8 | 9 | LINES |
|---|---|---|---|---|---|---|---|---|---|---|
| Sequence of Data | | | | | | | | | | |
| Record Unit Addr | 0 | 1 | 2 | 3 | 4 | 5 | 6 | 7 | | 1 |
| Keyfield Value | 7 | 5 | 13 | 17 | 2 | 8 | 10 | 6 | | 2 |
| Binary Rep. 1 | 1 | 1 | 1 | 1 | 0 | 0 | 0 | 0 | | 3 |
| 2 | 1 | 0 | 1 | 1 | 1 | 0 | 0 | 1 | | 4 |
| 4 | 1 | 1 | 0 | 1 | 0 | 0 | 0 | 1 | | 5 |
| 8 | 0 | 0 | 0 | 0 | 0 | 1 | 0 | 0 | | 6 |
| 10 | 0 | 0 | 1 | 1 | 0 | 0 | 1 | 0 | | 7 |
| 20 | 0 | 0 | 0 | 0 | 0 | 0 | 0 | 0 | | 8 |
| 40 | 0 | 0 | 0 | 0 | 0 | 0 | 0 | 0 | | 9 |
| 80 | 0 | 0 | 0 | 0 | 0 | 0 | 0 | 0 | | 10 |

TABLE 1B

| | Bit Value 1 | | | | | | | | |
|---|---|---|---|---|---|---|---|---|---|
| 1ST ADDRESS SEQUENCE | Addr. Reg. A(0) | 0 | 1 | 2 | 3 | 4 | 5 | 6 | 7 |
| | Addr. Reg. A(1) | - | - | - | - | - | - | - | - |
| | Keyfield Value | 1 | 1 | 1 | 1 | 0 | 0 | 0 | 0 |
| 1ST ADDRESS SUBSEQUENCE | Addr. Reg. B(0) | | | | | 4 | 5 | 6 | 7 |
| 2ND ADDRESS SUBSEQUENCE | Addr. Reg. B(1) | 0 | 1 | 2 | 3 | | | | |

TABLE 1C

| | Bit Value 2 | | | | | | | | |
|---|---|---|---|---|---|---|---|---|---|
| 2ND ADDRESS SEQUENCE | Addr. Reg. B(0) | 4 | 5 | 6 | 7 | | | | |
| | Addr. Reg. B(1) | | | | | 0 | 1 | 2 | 3 |
| | Keyfield Value | 1 | 0 | 0 | 1 | 1 | 0 | 1 | 1 |
| 3RD ADDRESS SUBSEQUENCE | Addr. Reg. A(0) | | 5 | 6 | | | 1 | | |
| 4TH ADDRESS SUBSEQUENCE | Addr. Reg. A(1) | 4 | | | 7 | 0 | | 2 | 3 |

TABLE 1D

| | Bit Value 4 | | | | | | | | |
|---|---|---|---|---|---|---|---|---|---|
| 3RD ADDRESS SEQUENCE | Addr. Reg. A(0) | 5 | 6 | 1 | | | | | |
| | Addr. Reg. A(1) | | | | 4 | 7 | 0 | 2 | 3 |
| | Keyfield Value | 0 | 0 | 1 | 0 | 1 | 1 | 0 | 1 |
| 5TH ADDRESS SUBSEQUENCE | Addr. Reg. B(0) | 5 | 6 | | 4 | | | 2 | |
| 6TH ADDRESS SUBSEQUENCE | Addr. Reg. B(1) | | | 1 | | 7 | 0 | | 3 |

FIG. 1a

INVENTOR.
GERHARD DIRKS

BY [illegible]
Attorney

TABLE 1E

| | Bit Value 8 | | | | | | | | |
|---|---|---|---|---|---|---|---|---|---|
| 4TH ADDRESS SEQUENCE | Addr. Reg. B(0) | 5 | 6 | 4 | 2 | | | | |
| | Addr. Reg. B(1) | | | | | 1 | 7 | 0 | 3 |
| | Keyfield Value | 1 | 0 | 0 | 0 | 0 | 0 | 0 | 0 |
| 7TH ADDRESS SUBSEQUENCE | Addr. Reg. A(0) | | 6 | 4 | 2 | 1 | 7 | 0 | 3 |
| 8TH ADDRESS SUBSEQUENCE | Addr. Reg. A(1) | 5 | | | | | | | |

TABLE 1F

| | Bit Value 10 | | | | | | | | |
|---|---|---|---|---|---|---|---|---|---|
| 5TH ADDRESS SEQUENCE | Addr. Reg. A(0) | 6 | 4 | 2 | 1 | 7 | 0 | 3 | |
| | Addr. Reg. A(1) | | | | | | | | 5 |
| | Keyfield Value | 1 | 0 | 1 | 0 | 0 | 0 | 1 | 0 |
| 9TH ADDRESS SUBSEQUENCE | Addr. Reg. B(0) | | 4 | | 1 | 7 | 0 | | 5 |
| 10TH ADDRESS SUBSEQUENCE | Addr. Reg. B(1) | 6 | | 2 | | | | 3 | |

TABLE 1G

| | Bit Value 20 | | | | | | | | |
|---|---|---|---|---|---|---|---|---|---|
| 6TH ADDRESS SEQUENCE | Addr. Reg. B(0) | 4 | 1 | 7 | 0 | 5 | | | |
| | Addr. Reg. B(1) | | | | | | 6 | 2 | 3 |
| | Keyfield Value | 0 | 0 | 0 | 0 | 0 | 0 | 0 | 0 |
| 11TH ADDRESS SUBSEQUENCE | Addr. Reg. A(0) | 4 | 1 | 7 | 0 | 5 | 6 | 2 | 3 |
| 12TH ADDRESS SUBSEQUENCE | Addr. Reg. A(1) | | | | | | | | |

TABLE 1 H

| Sequence of Data | | | | | | | | |
|---|---|---|---|---|---|---|---|---|
| Memory Address | 4 | 1 | 7 | 0 | 5 | 6 | 2 | 3 |
| Memory Content | 2 | 5 | 6 | 7 | 8 | 10 | 13 | 17 |

FIG. 1b

INVENTOR.
GERHARD DIRKS

BY

Attorney

Patented Jan. 30, 1973

3,714,634

8 Sheets-Sheet 3

INVENTOR.
GERHARD DIRKS

BY [signature]
Attorney

Patented Jan. 30, 1973 3,714,634

8 Sheets-Sheet 4

INVENTOR.
GERHARD DIRKS

BY

Attorney

INVENTOR.
GERHARD DIRKS
BY Michael I. Weber
Attorney

INVENTOR.
GERHARD DIRKS
BY [signature]
Attorney

INVENTOR.
GERHARD DIRKS

BY

Attorney

Patented Jan. 30, 1973 3,714,634

8 Sheets-Sheet 8

INVENTOR.
GERHARD DIRKS

BY Milton L. Stacker
Attorney

METHOD AND SYSTEM FOR SORTING WITHOUT COMPARATOR

BACKGROUND OF THE INVENTION

This invention relates to systems and methods for merging and sorting record units in accordance with the value of a keyfield associated with each record unit. Data handling systems handling such record units are well known. A record unit may, for example, comprise the name of an individual, his age, his address, his social security number, his annual wage and the number of sick leave days taken. It may of course include any number of other items, depending upon the need of the particular company. The items cited here are simply examples. The record units are then to be arranged in some sequence in accordance with a keyfield value, where keyfield refers to a particular part of the record unit, as, for example, the annual wage of the employee. Each field, including the keyfield, contains one or more alpha-numeric characters. In turn, the alpha-numeric characters are coded by a plurality of bits, each bit having a weight or place value depending upon its position in the field.

As stated above data handling systems for sorting and merging such record units either in ascending or descending value of keyfield are well known. The prior art may be divided into general purpose computers which are capable of performing highly complicated scientific computations as well as simple business computations and whose rental cost is extremely high, while the processing speed is relatively slow. Further, special purpose computers exist in the prior art as for example disclosed in my U. S. my Pat. No. 3,343,133. Such a special purpose computer has rotating storage or shift register memories, etc. and performs the sorting operation by direct comparison of keyfields in an arrangement of several comparators. Each bit of each keyfield is compared with all equally weighted bits of all other keyfields involved in the operation. The result is a comparison of comparison results, which can be continued until the desired sequence of record units has been established.

The present invention discloses a method of sorting a plurality of record units without comparison of keyfield bits. It further discloses a data handling system incorporating such a method and offering high sorting speeds with a relatively small amount of required equipment.

SUMMARY OF THE INVENTION

This invention comprises a method for sorting a plurality of record units, each having a keyfield, in accordance with the code value of said key fields. Each of the keyfields comprise a plurality of keyfield bits arranged in a predetermined keyfield bit order. Each of said record units is further accessible by a corresponding record unit address. The method comprises the steps of furnishing all of the record unit addresses in a first control address sequence. Said first control address sequence is divided into a first and second address subsequence, comprising, respectively, all addresses corresponding to record units whose first keyfield bit in said predetermined keyfield bit order is "0" and "1". The first and second address subsequences are combined into a second control address subsequence wherein members of said first address subsequence precede the members of said second address subsequence. The steps of dividing the address sequences into subsequences and combining the subsequences into further sequences are repeated under control of the remaining keyfield bits. Upon completion of the combination of subsequences furnished under control of the last keyfield bit, the record unit addresses are in order of keyfield value. The record unit addresses in this order may then be used to read out the record units in a corresponding order, thereby furnishing the sorted sequence.

The present invention further comprises a data handling system handling record units as described above. The data handling system comprises register means storing keyfield bits in addressable register locations. It further comprises first and second record unit address storage means each having a "0" assigned storage location and a "1" assigned storage location. Input means are operatively associated with said first record unit address storage means and enter record unit addresses, each providing access to a corresponding record unit therein. Register addressing means are connected to said register means and furnish selected keyfield bits at least in part under control of record unit addresses stored in said first or second record unit address storage means. Finally, address transfer means interconnect said first and second record unit address storage means and said register means, and transfer addresses between said first and second record unit address storage means under control of said selected keyfield bits in such a manner that all record unit addresses under control of a "0" keyfield bit are transferred to consecutively addressable record unit address storage locations starting with said "0" assigned record unit address storage location, and all record unit addresses under control of a "1" keyfield bit are transferred into consecutively addressable record unit address storage locations starting with said "1" assigned record unit address storage location.

In a particular preferred embodiment of the invention, the record units are furnished from a cyclic data storage means in an arbitrary sequence and are read out under control of the sorted record unit addresses in one of the first or second record unit address storage means in the sorted sequence.

The record units may be recorded in the first cyclic storage means in an interlaced pattern, in which case only one read-out element is required for the cyclic storage means.

Alternatively, the data may be stored in the first cyclic data storage means in a non-interlaced pattern in which case, in a preferred embodiment, a plurality of read-out means is provided to furnish substantially simultaneously equally weighted keyfield bits from each record unit. In either case, each transfer from one record unit address storage means to the other is accomplished under control of a set of equally weighted keyfield bits, one from each record unit. Each keyfield bit controls the transfer of the corresponding record unit address to a storage location associated with either the "0" assigned storage location or the "1" assigned storage location depending upon the value of the keyfield bit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIGS. 1*a* and 1*b* depict a series of tables illustrating the method of the present invention;

DESCRIPTION OF THE PREFERRED EMBODIMENT

Figure 2:
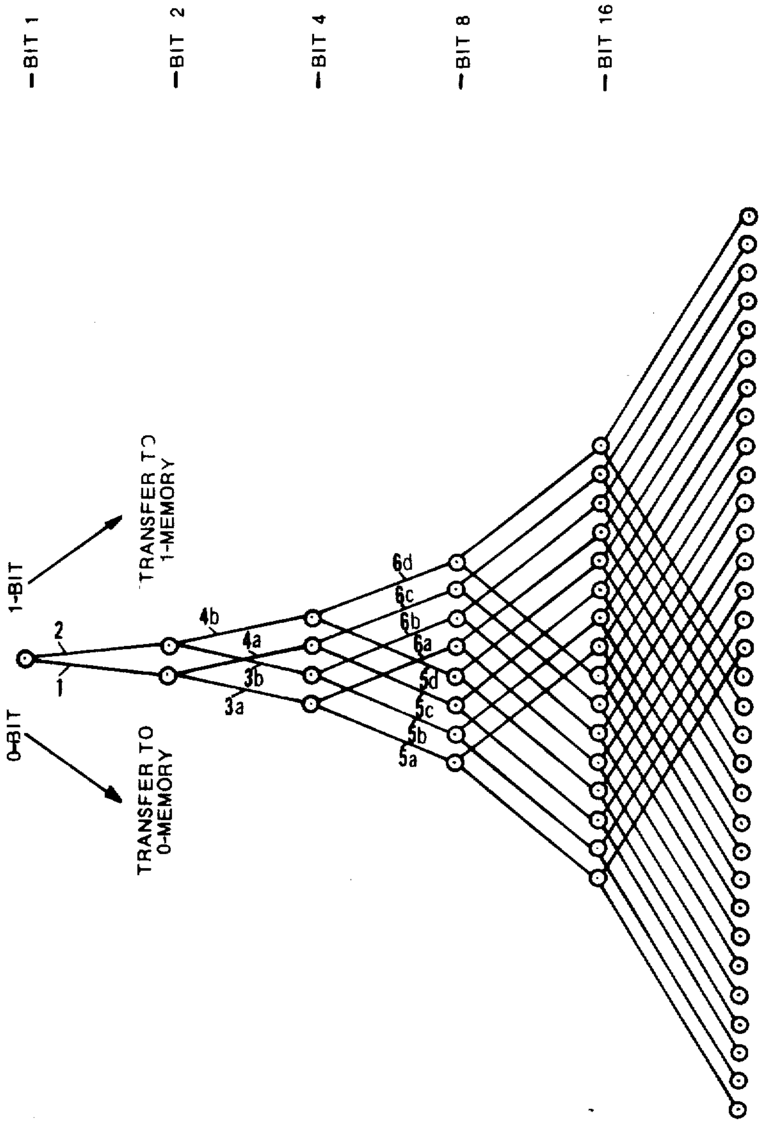
FIG. 2 is a diagram illustrating the method of the present invention.

The preferred embodiment of the present invention will now be described with reference to the drawing.

Before proceeding with the description of the method of the present invention, as illustrated in FIGS. 1 and 2, a number of definitions and a discussion of some of the terms used in this application will be furnished.

The record units to be sorted by the method of the present invention are record units as described in the Background of the Invention of this application and are to be sorted in accordance with the keyfield value. Each keyfield may comprise a plurality of alpha numeric characters, these characters being coded by bits, each of the bits having either a "0" or a "1" value, respectively signifying the absence and presence of the value associated with the bit. The weight of each bit depends on its position in the keyfield bit sequence. For example, a keyfield value of 7 might be illustrated by the sequence 111, where the first bit has a weight of 1, the second a weight of 2 and the third a weight of 4. In a serial type of system, these bits may be furnished in sequence as they are read out from a cyclic storage for example. The time at which a bit of a particular weight is available for sensing is a bit time. Associated with each bit time is a timing signal called a bit time clock pulse (btc1). When bits of a particular record unit are read out in sequence, followed by bits of the subsequent record unit, the system is a non-interlaced system. In an interlaced system, each bit time is divided into equal parts, each part being called a subbit time. In such an interlaced system each set of bits, comprising the bits included between consecutive bit times, comprises an equally weighted bit from each record unit. Thus the number of bits in each set of bits occurring between consecutive bit times is equal to the number of record units to be sorted. Bits of the same record unit always occur in the same subbit time. For example if, following the first bit time, bits of record units A,B,C, and D are furnished in subbit times in that order, following the next bit time the same arrangement will prevail. In other words, a bit is related to a specific record unit by its position within the set of equally weighted bits.

It should also further be noted that subbit times are herein alternatively referred to as time slots.

The method in accordance with this invention, whose object it is to sort these record units into a sequence in order of keyfield values, will now be illustrated with reference to Tables 1A through 1H shown in FIGS. 1*a* and 1*b*.

Table 1 A shows the keyfield values of eight record units in the sequence in which these record units are originally stored. This is the first address sequence and is a completely arbitrary sequence. Record unit addresses 0 to 7 as shown in line 1 have been assigned arbitrarily to the keyfields and the corresponding record units. Address words serve as identification of independent record units and provide access to these record units.

Column 1, lines 3 to 9 indicate the bit weight assignment to the bits representing the keyfield values. In each of columns 2 to 9 the bit patterns of each of the eight keyfields are shown. The values of keyfields have been restricted to less than 20 to keep the example short. All bits representing higher weights than 20 will be 0-bits and not cause any change or action in this operation. The first keyfield has the value 7, represented by the bit pattern 111000. Address 0 is assigned to this keyfield. The second keyfield shown in column 3 has the value 5, bit pattern 101000 and is accessible at record unit address 1. The third keyfield, column 4, has the value 13, represented by bit pattern 110010, located at record unit address 2.

The record unit addresses and keyfield values of the remaining units can be similarly derived.

It is assumed that the record unit addresses are furnished in a first address sequence, namely 0 to 7 in numeric order and are stored in address register A(0). This first address sequence will, in accordance with the method of this invention, be divided into a first and second address subsequence, comprising, respectively, addresses accessing record units whose first (least) significant keyfield bit is "0" and addresses accessing record units whose first significant keyfield bit is a "1". It is assumed that the first address sequence, an arbitrary sequence, independent of keyfield value, is stored in address register A(0). (It might be noted here that the division of the first address sequence into a first address subsequence and a second address subsequence which will be discussed in detail below is accomplished in the equipment of the present invention during the initial read-in of the record unit addresses into the first record unit address storage means A. For purposes of simplicity, this step is omitted here and it is assumed that the record unit addresses are originally stored in said first record unit storage means in an arbitrary sequence.) Record unit address storage means A (called address register A) has a "0 assigned storage location" and a "1 assigned storage location." The same is true of address register B. In the Tables of FIGS. 1*a* and 1*b* storage locations marked address register A(0) and A(1) refer, respectively, to locations in address register A following the "0 assigned storage location" and the "1 assigned storage location", respectively. Again, the same is true of address register B.

Table 1 B illustrates what is accomplished in the first passage of the sorting operation. The record unit addresses are selected from address register A(0) in the sequence in which they are initially stored therein. Table 1 B, line 1 shows the first address sequence, namely address words stored in ascending order in address memory A(0). Thus, record unit address 0 will be read first. The first bit of the keyfield related to record unit address 0 is a 1-bit, causing record unit address 0 to be assigned to the second address subsequence, which is stored in address register B(1). The next record unit address to be considered is record unit address 1. The least significant keyfield bit associated with the record unit accessible at record unit address 1 is also a 1, causing record unit address 1 to be assigned to the second address subsequence and stored in address register B(1) following record unit address 0. Next record unit addresses 2 and 3 are considered in turn. Each of these has a least significant keyfield bit of 1 in the associated keyfield of the associated record unit. Record unit address 2 and 3 are therefore also assigned to the second address subsequence and stored in address register B(1) in storage locations following the location to which record unit address 1 was assigned. The fifth record unit address, namely record unit address 4, accesses a record unit having a 0 in the keyfield position having a bit value of 1. Therefore record unit address 4 is assigned to the first address subsequence and stored in the "0" assigned storage location of address register B(0). Record unit addresses 5, 6 and 7 each also have a 0 in the least significant keyfield bit and are therefore assigned to the first address subsequence and stored in address register B(0) following record unit address 4. Thus the first address sequence has been subdivided into a first address subsequence containing record unit addresses 4, 5, 6, and 7; and a second address subsequence containing record unit addresses 0, 1, 2, and 3.

The first address subsequence and second address subsequence are next combined to form a second address sequence, wherein members of the first address subsequence precede members of the second address subsequence. Thus record unit addresses 4, 5, 6 and 7 precede record unit addresses 0, 1, 2 and 3 and the second address sequence contains the record unit addresses in this order: 4, 5, 6, 7, 0, 1, 2, 3. This is shown in the top half of Table 1 C. The first portion of the second address sequence is stored in address register B(0), while the second portion is stored in address register B(1). This second address sequence will now be divided into a third and fourth address subsequence in accordance with the keyfield bit of next higher weight, that is in accordance with corresponding keyfield bits having a weight of 2. These keyfield bits are found in line 4 of Table 1 A. Thus, for record unit address 4 the corresponding keyfield bit of weight 2 is a 1. Record unit address 4 is therefore assigned to the fourth address subsequence. Next, record unit address 5 is transferred to the third address subsequence, since the corresponding keyfield bit of weight 2 is a 0. The same is true of record unit address 6. Record unit address 7 has a corresponding keyfield bit of 1 in the second keyfield position and is therefore assigned to the fourth address subsequence, as is record unit address 0. Record unit address 1 has a 0 keyfield bit in the corresponding keyfield bit position of weight 2 and is therefore assigned to the third address subsequence, while record unit addresses 2 and 3 each have a 1 in the corresponding keyfield bit position of weight 2 and are therefore assigned to the fourth address subsequence. This is illustrated in the bottom half of Table 1 C, where address register A(0) is shown to contain record unit addresses 5, 6, and 1, while address register A(1) contains record unit addresses 4, 7, 0, 2 and 3.

The third and fourth address subsequences are now combined into a third address sequence containing the record unit addresses in the following order: 5, 6, 1, 4, 7, 0, 2, 3. The lower half of Table 1 D then shows the division of the third address sequence into a fifth and sixth address subsequence, while the top half of Table 1 E shows the combination of the fifth and sixth address subsequences into a fourth address sequence containing the record unit addresses in the order 5, 6, 4, 2, 1, 7, 0, and 3. The so derived fourth address sequence is again subdivided into a seventh and eighth address subsequence under control of corresponding keyfield bits having a weight of 8, as shown in Table 1 E.

The sixth address sequence shown at the top of Table 1 F is divided into a ninth and tenth address subsequence in dependence on the keyfield bits of weight 10. The ninth and tenth address subsequence are then recombined into a sixth address sequence shown at the top of Table 1 G and containing record unit addresses in the following order: 4, 1, 7, 0, 5, 6, 2, 3. It will be noted that the sixth address sequence should now be subdivided into eleventh and twelfth address subsequences in dependence upon keyfield bits of value 20. However it was assumed in this example that all keyfield bits of value 20 and above are 0. Therefore all record unit addresses in the sixth address sequence will be assigned to the eleventh address subsequence. This eleventh address subsequence is shown in the lower half of Table 1 G and contains the record units in the same order as the sixth address sequence. Table 1 H shows that the eleventh address subsequence containing record unit addresses in the order of 4, 1, 7, 0, 5, 6, 2, and 3 constitutes a sequence of record unit addresses in the order of ascending keyfield values. Thus record unit addresses 4 accesses a record unit having a keyfield value of 2 record unit address 1 accesses a record unit having a keyfield value of 5, etc. As shown in Table 1 H, the keyfield values associated with the record units accessible by the record unit addresses are of increasing value. The object of the present invention, namely the sorting of the record unit addresses in a predetermined order (ascending order) of keyfield values has been accomplished.

The theoretical basis for the above illustrated method will now be discussed in relation to FIG. 2 which is an illustration of the principle of sorting in accordance with keyfields wherein the least significant bit is presented first. Starting on the left-hand side of the Figure, the record unit addresses are separated into a first and a second address subsequence comprising those members having a 0 bit in the least significant bit position and a 1 bit as a least significant keyfield bit, respectively. Thus line 1 indicates a record unit address subsequence including all even keyfield values, while line 2, the second address subsequence, includes all record unit addresses having odd keyfield values.

The first address subsequence is then divided into a third and fourth subsequence under control of the next significant keyfield bit in the keyfields associated with the record unit addresses in the first address subsequence. This results in subsequences marked 3a and 4a in FIG. 2. Sequence 3a contains all record unit addresses of the first address subsequence whose second significant bit is a 0, while subsequence 4a contains all record unit addresses of the first address subsequence whose second keyfield bit is a 1. Similarly the second address subsequence is divided into subsequences marked 3b and 4b, respectively comprising record unit addresses whose second keyfield bit is a 0 and a 1. Lines 3a and 3b therefore jointly signify all record unit addresses of the third address subsequence in FIG. 1, namely record unit addresses 5, 6, and 1. It will be noted that record unit addresses 5 and 6 are included in subsequence 3a of FIG. 2, while record unit address 1 is schematically indicated by line 3b. Since the record unit addresses are always examined in sequence, it is not necessary to physically differentiate between subsequence 3a and subsequence 3b. Similarly, record unit addresses 4 and 7 are signified by line 4a in FIG. 2, while record unit addresses 0, 2, and 3 are contained in subsequence 4b of FIG. 2.

Theoretically, in turn, each of these subsequences 3a, 3b, 4a, and 4b can then be subdivided into address subsequences 5 and 6 and having components 5a, 5b, 5c and 5d and 6a, 6b, 6c and 6d respectively, under control of the next significant keyfield bit. Downward slanted lines are always labelled 5 and belong to the fifth subsequence, namely the subsequence formed by record unit addresses having a 0 keyfield bit in the place of the keyfield being examined. The upward slanted lines are associated with the sixth address subsequence and contain all record unit addresses having a keyfield bit of value 1 in the keyfield bit position being examined. At this point this is keyfield bit of value 4.

Figure 3:
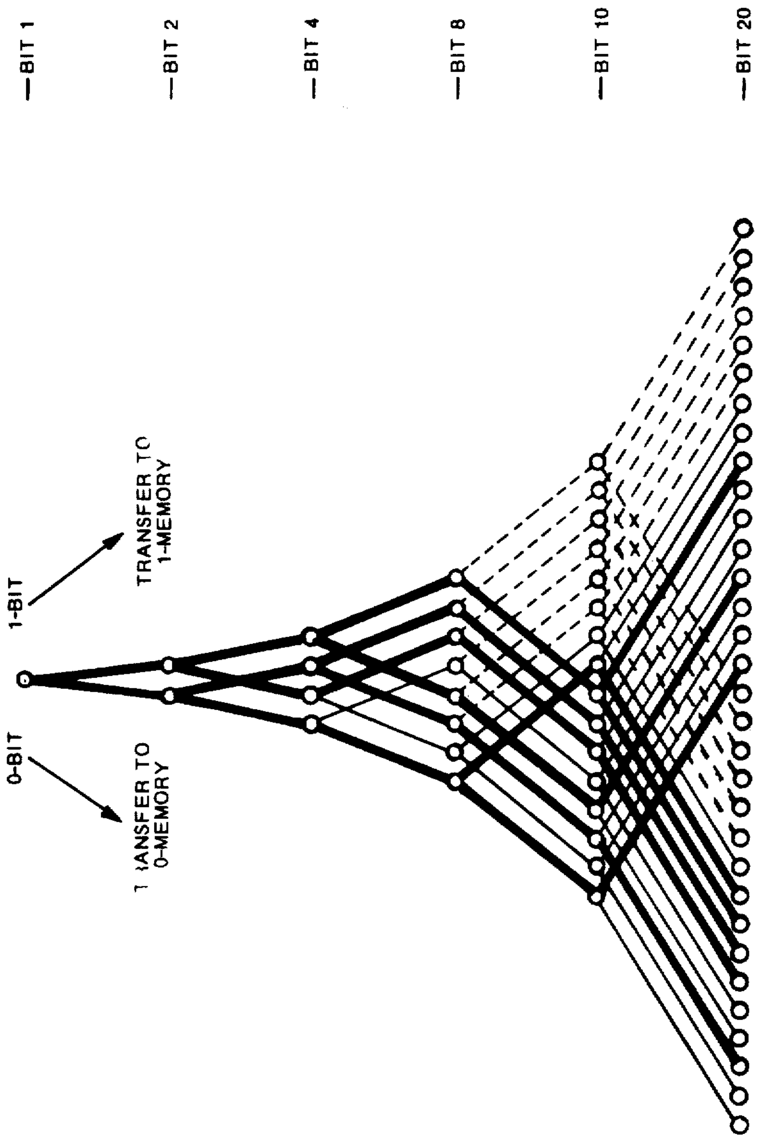
FIG. 3 is identical to FIG. 2, except that subsequences present in the example of FIG. 1 are shown as dark lines, subsequence absent are shown in solid, light lines and invalid subsequences for a B C D code are shown as dashed lines.

While in the theory record unit addresses may be contained in any of the subsequences from 5a to 6d, this is not the case in the example shown in FIG. 1. It will be noted that in FIG. 1 the division into the fifth and sixth address subsequence are shown to take place under control of keyfield bit of weight 4. This is shown in Table 1 D. Further it must be noted that the third address subsequence contains record unit addresses 5, 6, and 1, of which 5 and 6 belong to subsequence 3a, while record unit address 1 belongs to subsequence 3b. Reference to Table 1 D shows that the keyfield bit of weight 4 for both record unit addresses 5 and 6 is a 0. Therefore, when the third address sequence is subdivided into a fifth and sixth address subsequence, subsequence 3a does not contain any record unit addresses associated with a keyfield bit of 1 in the weight value 4 being examined. Therefore, subsequence 6a is actually empty. Reference to FIG. 3 shows that the line signifying subsequence 6a is a light solid line indicating that is belongs to a subsequence which could be present, but is not in the example being shown. It will be noted that in FIG. 3 all lines indicating subsequences actually present in the example are shown as dark solid lines, those which indicate valid subsequences in a binary coded decimal system are indicated by light lines if absent in the example of FIG. 1, while those lines indicating combinations which are not valid in a binary coded decimal code are indicated by dashed lines in FIG. 3. Thus, again, the subsequence 5b is empty since no record unit addresses having a 0 bit in the keyfield position of weight 4 are present in subsequence 3b. Address subsequence 3b contains only record unit address 1 as shown in Table 1C. The remaining lines of FIG. 3 can be determined in an analogous fashion. It will be seen that FIG. 3 has eight valid outputs which signify the eight record units in order of keyfield values.

A preferred embodiment of an address rearrangement system in accordance with the present invention will now be discussed with reference, first, to FIG. 4. It will be noted that no comparator for comparing data bits of keyfields from different record units with each other is used in this system and that the above-described method of address relocation is used to effect the sorting. In the preferred embodiment shown in this application, record unit address storage means having selectively addressable storage locations are used.

It should be noted that in the preferred embodiment of this invention, it is assumed that the record units are stored in a cyclic storage and that the bits thereof are accessible in series. It will further first be assumed that the keyfield precedes the other fields in the record units. The data may be stored in the above-mentioned cyclic storage in either an interlaced or a non-interlaced fashion. Appropriate read-out means for each type of storage will be discussed later. For considering FIG. 4, it is only essential that it be understood that the record unit addresses are transferred from a first record unit address storage means, namely address register A to a second record unit address storage means, namely address register B and vice versa. The transfer of all record unit addresses takes place within one bit time and transfer of a single record unit address is effected during a subbit time or time slot. It will be remembered that the division of the sequence of record unit addresses into subsequences took place under control of equally weighted keyfield bits, one from each record unit. The keyfield bits are assumed to be the first bits read from the cyclic data storage containing the record units. They are received at the terminal marked data input in FIG. 4. If they are received in series they are first put to a series-parallel converter and then transferred to a holding register (register means) under control of a load control signal. The holding register is controlled in such a manner that, starting with the least significant keyfield bit, the next significant keyfield bits from all record units are entered therein at the beginning of each bit time. They are held therein until all record unit addresses have been transferred, each under control of the appropriate keyfield bit. The next significant keyfield bit from each record unit is then entered, at the beginning of the subsequent bit time. Bits of a given record unit are always entered into the same location in the holding register. Individual locations in the holding register may be accessible for read-out via register addressing means 10,13. Multiplexer 10 makes it possible to select any one of the bits stored in holding register 11 under control of signals on lines 12. It should be noted that while lines 12 are indicated as a single line, actually a plurality of lines is required in order to address each position of the holding register by means of the multiplexer. The simplification of indicating a plurality of lines for parallel transfers of signals as a single line is used throughout this Figure to avoid confusion. The same applies to all gates connected to such parallel transfer lines, e.g. OR-ages 13. Multiplexer 10 together with OR gates 13 having output lines 12 constitute register addressing means.

Mode control 40 is used to control the direction of transfer, that is whether the transfer takes place from address register A to address register B or vice versa. This mode control may simply be a flip-flop changed from one stable state to the other by the bit time clock pulse occurring during the keyfield time.

The flip-flop is changed from one stable state to the other by an output from AND gate 59, which has a first input receiving said bit time clock pulses during the keyfield time and a second input which is the output of an OR gate 60. The inputs to OR gate 60 are END OF LOAD signals signifying the end of loading ad Address Registers A and B. The derivation of these signals will be discussed below in connection with FIG. 5.

During the time the first bit of each of the keyfields is stored in holding register 11, addresses on lines 12 controlling multiplexer 10 are supplied by counter 14, via lines 15, AND-gates 16, lines 17, OR-gates 13. Counter 14 is controlled by subbit clock pulses on line 19. Counter 14 is advanced by as many clock pulses on line 19 as there are bit storage locations on holding register 11. The counter output signals of counter 14 constitute the record unit addresses, since each counter output signal addresses a corresponding location in holding register 11 and each location in holding register 11 is supplied with the bits of a determined record unit in time sequence, as will be explained in greater detail in connection with FIGS. 6 and 7. AND-gates 16 are enabled during this time by a timing signal on line 18 which inhibits AND-gates 21 and 22 (respectively controlling the outputs of address register B and address register A) via inverter 20. Address signals passing AND-gates 16 (1st gating means) during the first bit time of the keyfields of a group of data are transferred via lines 23, OR-gates 24, lines 25 to the data input of address register A. The address input of address register A is controlled by 0-address counter 26 and 1-address counter 27. Address counter control 28 and mode control 40 operate as follows: mode control 40 provides an active output signal on line 29*a* enabling address counter control 28 to operate. Address counter control 28 activates 0-address counter 26 via line 31 and 1-address counter 27 via line 32. AND-gates 33 and 34 apply address register storage location addresses from 0-address counter 26 and 1-address counter 27 respectively to address register A. AND-gates 33 and 34 are activated by signals on lines 35 and 36 respectively. Either address counter 26 or address counter 27 may be used to address register A. The selection is made by the signal on line 37*a*, the output signal of multiplexer 10. If multiplexer 10 is addressed by a signal on lines 12 to a storage location of holding register 11 storing a 1-bit, the signal on line 37*a* will activate 1-address counter 27, which supplies a register address via lines 50, AND-gates 34 to address register A. If the addressed register location in holding register 11 stores a 0-bit, the signal on lines 37*a* will be inverted in inverter 58 and activate address counter 26 which supplies its address vial lines 38 and AND-gates 33 to address register A. The first output (address) furnished by counter 26 is the "0" assigned storage location of Address Register A.

An activated 1-address counter 27 supplies an address signal on lines 50 to AND-gates 34 for control of Address Register A and via lines 39 to address counter control 28 which in turn generates control signals on line 32 to advance 1-address counter 27 to the next storage address. The first output (address) furnished by counter 27 addresses the "1" assigned storage location in Address Register A.

0-address counter 26 supplies equivalent signals via lines 41 to address counter control 28 and receives advance counter signals via line 31. During the first bit time of a keyfield, address counters 26 and 27 control storage of record unit addresses supplied by counter 14 in Address Register A.

As soon as the first group of equally weighted bits of keyfields stored in holding register 11 have been interrogated, the signal on line 18 is removed, deactivating AND-gate 16, enabling gates 21 and 22 (2nd and 1st output gating means respectively) to respond to signals on their other two inputs. Simultaneously mode control 40 receives a first pulse on line 43 indicating the beginning of another bit time. Mode control 40 changes signals on output lines 29 and 30. In the new state, mode control 40 controls the transfer of addresses stored in Address Register A to Address Register B. Address counter control 28 is switched into a read mode while address counter control 46 operates in a write mode. The mode of operation of 0-address counter 44, 1-address counter 45, address counter control 46, and AND-gates 47 and 48, is identical to the operation described previously for the equivalent components 26, 27, 28, 33 and 34 of Address Register A. Address counter control 28 in read mode activates 0-address counter 26 via line 31 to read out record unit addresses from Address Register A. For this purpose 0-address counter 26 is reset into 0 position while 1-address counter 27 remains in its latest position. Starting from the "0" assigned storage location, 0-address counter 26 will address all storage locations of Address Register B in sequence until its address is equal to that stored in 1-address counter 27. Each time 0-address counter 26 addresses another location in Address Register A, the address stored in that location passes AND-gates 22 and is fed to multiplexer 10 via lines 49*b*, OR-gates 13 and lines 12. The same address is fed to the data input of Address Register B via line 49*c*. It is stored in Address Register B under control of address counter control 46 and either 0-address counter 44 or 1-address counter 45 depending on the content of the addressed register location in holding register 11. As soon as 0-address counter 26 reaches a state equal to the state of 1-address counter 27, address counter control 28 will deactivate 0-counter 26 and reset 1-address counter 27 to its original state. 1-address counter 27 will start reading record unit address from "1" assigned storage location of Address Register A and continue on consecutively addressable record unit address storage locations in said Address Register A. 1-address counter 27 supplies the location addresses to the address input of address Register A via lines 50 and AND-gates 34.

The same address is also supplied to address counter control 28 via lines 39 for comparison with the address stored in 0-address counter 26. The cycle during which addresses are transferred from Address Register A via AND-gate 22 and line 49c to Address Register B is terminated as soon as 1-address counter 27 reaches a stage equal to that of 0-address counter 26, as will be explained in more detail with reference to FIG. 5. At that time all keyfield bits stored in holding register 11 have been interrogated and used for relocating record unit addresses from Address Register A to Address Register B. Signals identifying the content of the addressed register location in holding register 11 have been supplied to 1-address counter 45 via line 37*b* and 37*c* while 0-address counter 44 received the inverted signal of line 37b via inverter 51 and line 52. During the same time the serial parallel converter has been loaded with the next group of equally weighted keyfield bits. This group of bits is transferred into holding register 11 by a signal on line 53 while simultaneously mode control 40 receives a switch pulse on line 43. Mode control 40 changes mode of operation and controls transfer of addresses from Address Register B to Address Register A in a similar manner as described before. During this phase record unit addresses are supplied by Address Register B to AND-gate 21 and reach the data input of Address Register A via OR gates 24 and lines 25. AND-gates 21 supply the same signals via lines 49*a* to OR gate 13 and line 12 for selective control of multiplexer 10.

The alternating transfer of record unit addresses from Address Register B to Address Register A and vice versa is controlled by mode control 40 which receives one pulse per bit time on line 43 simultaneously with holding register 11 receiving a load signal on line 53 except that the signal on line 43 which switches mode control 40 is generated only if holding register 11 receives bits related to the keyfield. As soon as the total keyfield has been interrogated and data bits not related to the keyfield are entered into holding register 11, mode control 40 remains in its last state. At this time the sequence of the record unit addresses stored in either Address Register A or Address Register B (corresponding to the last state of mode control 40) is in accordance with the values of the keyfields relative to each other. A data transfer signal on line 54 will activate AND-gate 55 and provide a data output on line 56 for bits selected from holding register 11 via line 37*a* and 57. Because mode control 40 does not change state during this time of data read-out, record unit addresses will be read repetitively from that one of Address Registers A and B containing the sorted sequence during each bit time. It does not matter that the other one of the two Address Registers A and B (whichever is in write mode) records these record unit addresses.

Assuming that the keyfields of the record units to be sorted are placed in front of the other fields, the signal "first bit time in keyfield" is identical with the first bit time after start of the record unit. If the keyfield is embedded within the record unit, an equivalent control signal identifying the first character of the keyfield will be used to identify the first bit time within the first character of the keyfield.

It can be seen from the above that AND-gate 55 constitutes data output gating means, which are enabled by a signal on line 54, namely the output gating signal. The signal furnished at the terminal marked data output in FIG. 4 is an interlaced signal wherein bits of the same record unit always occupy the same subbit time. The order in which bits of the different record units occur during each bit time corresponds to the keyfield values of the record units.

The interconnection of a system as described above into the overall system having, for example, cyclic input and output storages, respectively supplying signals at the data input and receiving signals from the data output of FIG. 4, will be discussed below, following the discussion of the address counter control circuitry shown in FIG. 5.

It should be noted that the Address Registers A and B and multiplexer 10 are standard items which may be purchased off-the-shelf. In particularly, for Address Registers A and B Fairchild read-write memory 9035, which is a nondestructive semi-conductor memory may be used. Fairchild unit 9309 or 9312 may be used as a multiplexer. The clock signals may be derived directly from the cyclic storage means furnishing the data as will be described below.

Figure 4:
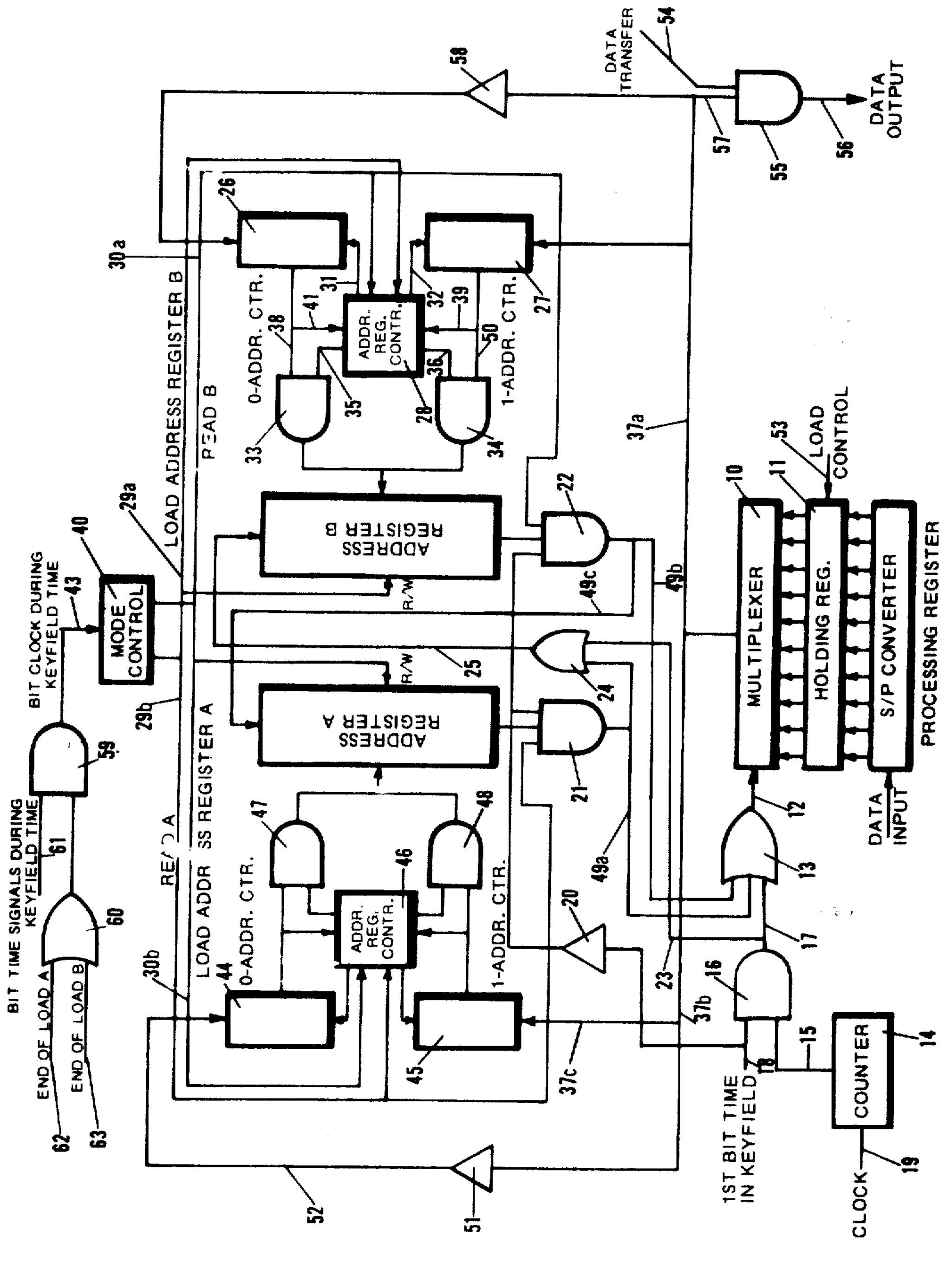
FIG. 4 is a block diagram of the sorting arrangement of this invention.
Figure 5:
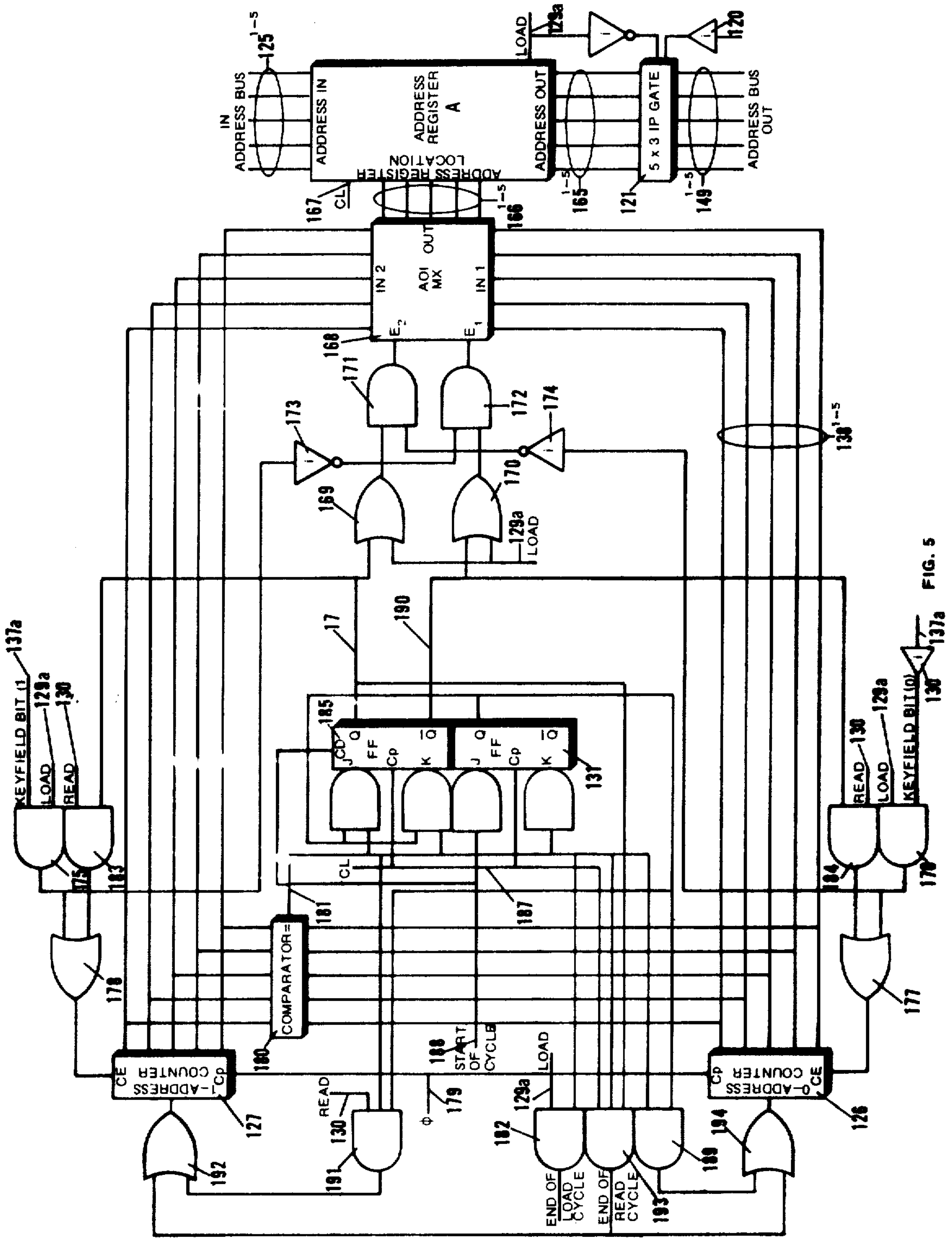
FIG. 5 is a block diagram illustrating the counter control system of FIG. 4 in detail.

FIG. 5 is an illustration of an address counter control circuit suitable for use in the circuit of FIG. 4. Some of the components shown in FIG. 4 are also shown in FIG. 5 in order to illustrate the interconnections. Corresponding components in FIG. 5 have the reference numeral of FIG. 4 but increased by 100. Those components having no corresponding components in FIG. 4 carry reference numerals over 164.

Shown in FIG. 5 is one embodiment of first record unit address storage means namely Address Register A, which is the same Address Register as shown in FIG. 4. Address register A has the size of 32 words of each five bits. Address Register A is shown to have input lines $125^{1-5}$ output lines $165^{1-5}$, and location selector lines $166^{1-5}$ to address anyone of the 32 locations. Lines $125^{1-5}$ correspond to lines 25 in FIG. 4. On these lines record unit addresses are furnished to Address Register A during the writing mode. Lines $149^{1-5}$ carry record unit addresses for transfer to Address Register B during the time Address Register A is in the read mode. Lines $166^{1-5}$ are location selector lines which select the particular storage location in Address Register A into which a record unit address is to be stored, or from which a record unit address is to be read.Further, Address Register A receives a mode control signal on line 129*a* which in this case is a write enable signal. The only remaining input to Address Register A is a clock input 167.

Address Register A receives selector output signals on the location selector lines $166^{1-5}$. The selector output signals are the output signals from second multiplexer means, labelled 168 in FIG. 5. Multiplexer means 168 correspond to a combination of AND-gates 33 and AND-gates 34 of FIG. 4. The selector output signals correspond, alternatively, to "1" selector signals received at input 2 of multiplexer 168, or "0" selector output signals furnished at input 1 or multiplexer 168. The "0" selector output signals are furnished by "0" address counter 126, while the "1" selector output signals are furnished by "1" address counter 127. The lines connecting the output of the "0" address counter 126 to the first input of multiplexer 168 are labelled $138^{1-5}$, while the lines connecting the output of "1" address counter 127 to the second input of multiplexer 105 are labelled $161^{1-5}$.

The selection of either the "1" address counter or the "0" address counter 126 as a source for energizing the location selector lines $166^{1-5}$ determining the Address Register location wherein the record unit address is to be stored in or read from depends upon the mode of operation. The first mode of operation to be considered is the mode wherein Address Register A is being loaded. At the beginning of this write or load mode "0" address counter 126 is set to all zeros, while "1" address counter 127 is set to all ones.

During this load mode, all lines 129a marked LOAD in FIG. 5 carry an active signal. This signal corresponds to signals on line 29a at the output of the mode control in FIG. 4. The LOAD signal is applied to OR gates 169 and 170, causing active signals to appear at the outputs of these gates. These signals in turn enable AND gates 171 and 172. AND gate 171 controls the transfer of memory location addresses from "1" to address counter 127 to the output of multiplexer 168, while AND gate 172 controls transfer of "0" address counter outputs to lines $166^{1-5}$. The second input of AND gate 172 is derived from the output of an inverter 173, while the second input of AND gate 171 is derived from the output of an inverter 174. It will be noted that inverter 173 invers the output signal of "1" counter gating means, namely AND gate 175, while inverter 174 inverts the output of "0" counter gating means, namely AND gate 176. AND gates 175 and 176 have, respectively, an active output signal if the keyfield bit under whose control the transfer is taking place is a "1" or a "0". Thus this portion of the circuit operates to cause the location in Address Register B to be determined by the "1" address counter when the keyfield bit is a "1" and the "0" address counter when the keyfield bit is a "0".

AND gate 175 and 176 further serves to enable "1" address counter 127 and "0" address counter 126, respectively. The output of AND gate 176 is connected to the enable input of "0" address counter 126 via an OR gate 177, while the output of AND gate 175 is connected to the enable input of the "1" address counter via OR gate 178.

While the Address Register A is enabled by signals on lines $166^{1-5}$ and the "0" and "1" address counters are enabled by the signals described above, the actual transfer into Address Register A takes place upon occurrence of a clock pulse on line 167, while whichever counter is enabled will be advanced by one count upon receipt of a clock signal on line 179. The clock signal on line 179 must follow by a slight delay the clock signal on line 167. The end of the load cycle is reached when address counter 126 is in a position adjacent to address counter 127, since the "1" address counter has been counting in reverse, while the "0" address counter is counting forward for each record unit address stored in Address Register A under control of a "1" and a "0" keyfield bit respectively.

This relationship in the positions between "0" address counter and the "1" address counter is determined by a comparator 180 whose output signal is furnished on a line 181 when the two counters have the above-mentioned adjacent outputs. An active signal on line 181 is a comparator output signal. The combination of the presence of a comparator output signal and a load mode control signal is indicated by an END-OF-LOAD cycle signal at the output of AND gate 182. The END-OF-LOAD cycle signal will cause the control and programming arrangement (mode control) to remove all load mode control signals. Next, the read control signals for address register A are activated. These correspond to signals on line 30b in FIG. 4. These signals enable AND gates 183 and 184. A START-OF-CYCLE signal on line 188 which is a timing signal prior to first subbit clock pulse of each bit time causes flip-flop 185 to be reset and flip-flop 186 to be set. The combination of an active start of cycle signal on line 188 and a comparator output signal on line 181 cause AND gate 189 to have an active output signal which causes "0" address counter 126 to be reset to the all zero state. The all zero state corresponds to the "0" assigned storage location in Address Register B. The resetting of "0" counter 126 causes the comparator output signal to become inactive. This in turn disables AND gate 189 and "0" address counter 126 is no longer clamped.

An active signal at the reset output of flip-flop 185 causes an active signal on line 190 which, together with the read mode signal on line 130a activates AND gate 184 and, via OR gate 177 activates the enable output of "0" a ddress counter 126. The "0" address counter will thus advance one step for each timing signal received on line 179. Further, the active signal on line 190 is transmitted via OR gate 170 to an input of AND gate 172 whose other input is active since no signal appears at the output of AND gate 175. Thus multi-plexer 168 is controlled in such a manner that "0" selector output signals, namely the output of "0" address counter 126 constitutes the signals on lines $166^{1-5}$, thereby determining the location in Address Register B which is to be read out. The record unit address in the so-addressed location is thereby available on lines $165^{1-5}$ and is transmitted to the address bus out via a gating arrangement 121 which is enabled by the absence of a load signal on line 129a. The record unit address appearing on the address bus out lines $149^{1-5}$ is fed to the multiplexer 10 of FIG. 4 for selecting a corresponding keyfield bit and is then transferred to the In-Address-Bus of Address Register A of FIG. 4. During this mode of operation Address Register A receives all record unit addresses and stores them in the proper sequence in the proper locations as controlled by the keyfield bits selected.

For each record unit address read out from Address Register B "0" address counter 126 is advanced by one count until comparator 180 issues a comparator output signal on line 181. Upon substantially simultaneous occurrence of a comparator output signal, and a signal at the set output of flip-flop 186, flip-flop 185 is enabled to flip to the set state in response to the next timing signal on line 181.

Simultaneous presence of a read signal on line 130, a comparator output signal and a signal at the set (Q) output of flip-flop 186 enable AND gate 191 and cause a resetting to all ones of one address counter 127 via OR gate 192. This resetting of one address counter 127 causes the comparator output signal to become inactive.

The output at Q of flip-flop 185 further is applied to an input of OR gate 169 and therethrough to an input of AND gate 171, whose other input is enabled by the absence of a load signal at the input of AND gate 176. Multiplexer 168 therefore operates in such a way that the selector output signals which determine the location in Address Register B from which record unit addresses will be read are derived from "1" address counter 127 rather than "0" address counter 126. Further, the Q output of flip-flop 185 enables AND gate 183 and causes "1" address counter 127 to be enabled via OR gate 178. "1" address counter 127 will thus count in reverse for each clock pulse received on line 179. Again, the clock signal on line 167, while occurring within the same subbit time as the clock signal on line 179 must precede the latter somewhat so that the read-out is completed before the "1" address counter is advanced.

The record unit addresses being read out under control of the "1" address counter 127 are used to select a keyfield bit (each a corresponding keyfield bit) and are stored in Address Register B (FIG. 4) in exactly the same manner as was discussed under record unit addresses furnished under control of "0" address counter 126.

The read-out of record unit addresses from Address Register B continues until a comparator output signal again appears on line 181. This comparator output signal in conjunction with an active signal on the Q output of flip-flop 185 cause an END OF READ cycle to be furnished at the output of AND gate 193. This END OF READ cycle resets the "1" address counter to ones state and the "0" address counter to all zeros state via OR gate 192 and 194 respectively.

Multiplexer 168 together with AND gates 171 and 172 constitute selection circuit means, while AND gate 189 constitutes "0" reset gating means. AND gate 182 is end load gating means while AND gate 191 constitutes "1" reset gating means. Flip-flops 186 and 185 constitute, respectively, first and second flip-flop means.

An overall system incorporating the arrangement shown in FIG. 4 will now be discussed with reference to FIG. 6. Components in FIG. 6 which are the same as components in FIG. 4 have the same reference numbers but increased by 200. It will be seen that FIG. 6 comprises a first cyclic storage means, 200, and an associated read-out means, here a single read-out element numbered 201. The first cyclic storage means may be a track on a drum, a disc, or any other appropriate form of cyclic storage means. In the embodiment in this Figure, data is stored on the first cyclic storage means in an interlaced fashion. Register input means comprising an AND gate 202 and a serial-parallel converter 203 furnish signals to the holding register 211. It will be noted that the data stored on the cyclic storage means is read out in serial fashion through AND gate 202 and converted by the serial parallel converter into sets of bits, where each set of bits comprises all bits during one bit time. Thus during the time that the keyfield is being read out, the serial parallel converter will hold, in turn, keyfield bits of equal weight from each record unit, starting, in this invention, with the least significant bit and continuing through the most significant bit. It will be noted that for the sorting operation it is necessary that the keyfield bits be read out first. Thus synchronizing means must be furnished which cause the AND gate 202 to become conductive and thus responsive to data on the first cyclic storage means first when the keyfield bits are being read out. The synchronizing means 207 may, for example, comprise a flip-flop set by a synchronizing signal furnished by cyclic storage 200 via an additional read-out element 208. Other sets of bits will then be read out subsequently. In every case the serial parallel converter will hold, at one time, equally weighted bits of the same field in each record unit. The data stored in the serial parallel converter is then transferred to the holding register under control of the load control signal. This load control signal causes data to be shifted from the serial parallel converter 203 to the holding register 211 at the beginning of each bit time. The multiplexer 210 is addressed by record unit addresses under control of the sorting arrangement of FIG. 4. It will be noted that lines 212 (shown as a single line but symbolizing multiple lines) from a sorting arrangement, here labelled 204, cause the contents of a particular register location (one bit) to appear at the output of the multiplexer 210 and to be transferred from this output to a second cyclic storage means 206 via output gating means, namely AND gate 255, and writing means 205. In this particular embodiment the writing means are a single element. Data is stored in the second cyclic storage means in an interlaced fashion. During the keyfield time the outputs of multiplexer 210 also serve as an input to sorting arrangement 204, to control the sorting process. While this input continues during transfer of other fields, it serves no useful function except during the keyfield time.

It will be noted that in this system data is read from the first cyclic storage means, sorted and entered upon the second cyclic storage means in sorted sequence, all within one pass or one cycle of said cyclic storage means. The sorting takes place during the keyfield time which precedes the read out of other data. Record unit addresses as sorted in accordance with keyfield values, then control the transfer of the remaining data from the holding register to the second cyclic storage means by rearranging the order in which bits of equal weight within one set of bits are read from the holding register, AND gate 255 is of course enabled by a data transfer signal supplied by the control of the arrangement only after the evolution of the keyfield has taken place during the keyfield time period.

Figure 6:
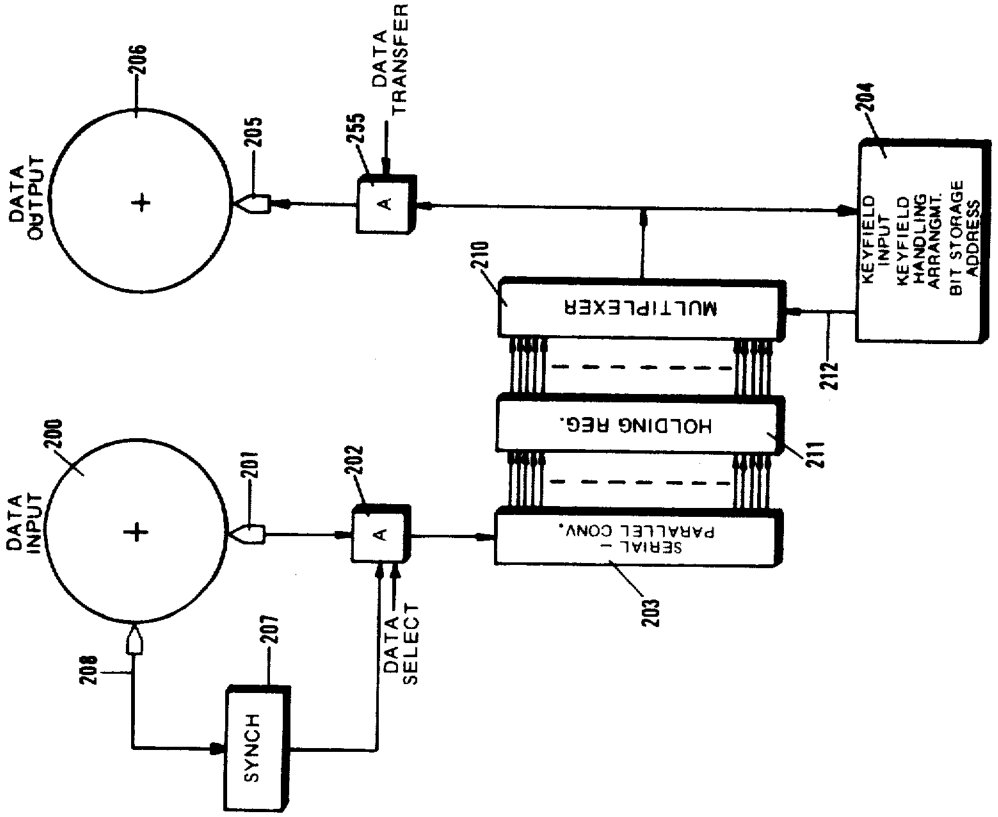
FIG. 6 is a block diagram showing a system incorporating the sorting arrangement of FIG. 4 using non-interlaced data.
Figure 7:
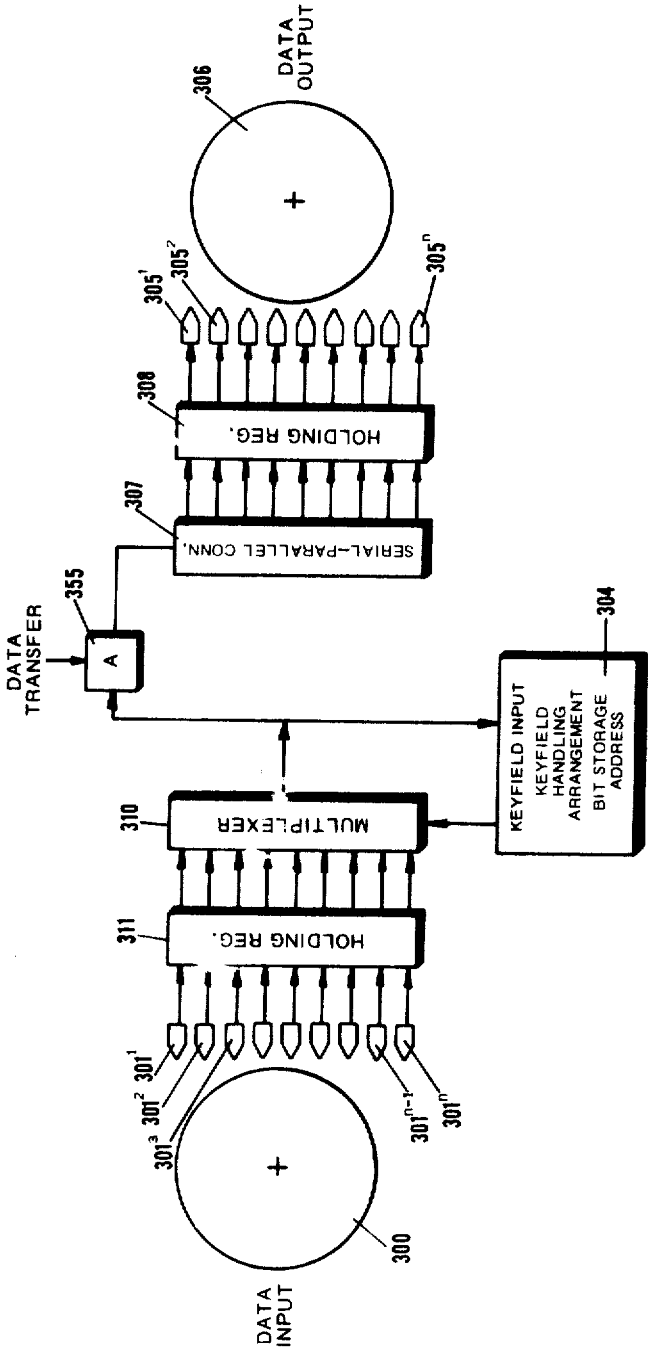
FIG. 7 is a system as in FIG. 6 but using interlaced data.

A system very similar to that of FIG. 6 is shown in FIG. 7. Again, elements corresponding to the same element in FIG. 6 have the same reference numeral but increased by 100. It will be noted that the system of FIG. 7 is almost identical to that of FIG. 6, except that the single read-out means 201 are replaced by multiple read-out means $301^{1-n}$, where n stands for the number of record units to be sorted or, equivalently, to the number of subbit times within a bit time. The read-out elements $301^{1-n}$ are arranged relative to the first cyclic storage means 300 in such a manner that they are spaced exactly one record unit apart, that is, equally weighted bits, one from each record unit, are read out simultaneously. This obviates the need for the serial parallel converter shown in FIG. 6. The so read out bits are stored immediately in holding register 311. Again, the transfer must be timed by a load control signal which is not shown and which may be derived from the first cyclic storage means. For example, it may be a mark on a disc, on the drum, etc. Multiplexer 310 works in conjunction with the sorting arrangement 304 in exactly the same manner as discussed in relation to FIG. 6. During the data transfer time the output gating means 355 are made conductive and data is fed in a serial fashion into a serial parallel converter 307. The output of the serial parallel converter, when all bits in a particular bit time have been assembled, is transferred to a holding register 308 under control of a second load control signal which may also be derived from the first cyclic storage means because first and second cyclic storage means are operated in synchronism, e.g., both can be arranged on the same rotating memory. The output of the holding register is transferred to writing means $305^{1-2}$ which enter the data simultaneously into the second cyclic storage means 306. Write heads $305^{1-n}$ are also spaced one record unit apart. Each head $305^{1-n}$ is connected to a corresponding holding register location. It is seen that in this system the first and second cyclic storage means store data in a non-interlaced fashion. Again, gate 355 is activated only following the keyfield time and not during said keyfield time. Further, following the key-field time, sorting arrangement 304 causes bits to be read from holding register 311 in sorted sequence and they are loaded into the serial parallel converter in this sequence. Therefore, the holding register location and the recording head $305^{1-n}$ which is selected for bits of a particular record unit is generally not the same as the read head 301 which read the corresponding record unit from the first cyclic storage means. Effectively, sorting arrangement 304 determines the assignment of one of the recording heads $305^{1-n}$ to a particular record unit in accordance with the keyfield value of said unit. The data is then arranged in data storage means 306 in a sorted sequence.

The arrangement shown in FIGS. 6 and 7 can of course equally well used with sorting systems wherein the keyfield bits are presented in a descending order of significance, although the present examples as illustrated in FIGS. 1 through 5 is concerned with keyfield bits arranged in ascending order of significance.

The sorting method illustrated with reference to FIGS. 1, 2 and 3 is of course equally applicable to data furnished in static storage means.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. In a data handling system handling record units each having a keyfield, each of said keyfields comprising a plurality of keyfield bits arranged in a predetermined order of place value, a system for arranging said record units in accordance with the values of said keyfields, comprising, in combination, register means, storing said keyfield bits in addressable register locations; first and second record unit address storage means each having a "0" assigned storage location and a "1" assigned storage location; input means operatively associated with said first record unit storage means for entering record unit addresses, each providing access to a corresponding record unit, into said first record unit address storage means; register addressing means connected to said register means and said first and second register unit address storage means and furnishing selected keyfield bits at least in part under control of said record unit addresses; and address transfer means interconnecting said first and second record unit address storage means and said register means, for transferring record unit addresses back and forth between said first and second record unit storage means at least in part under control of said selected keyfield bits, in such a manner that all record unit addresses under control of "0" selected keyfield bits are transferred to consecutively addressable record unit address storage locations starting with said "0" assigned record unit address storage location and all record unit addresses under control of a "1" selected key field bit are transferred into consecutively addressable record unit address storage locations starting with said "1" assigned record unit address storage location.

2. A system as set forth in claim 1, further comprising register input means for entering into said register means, in sequence, a plurality of sets of key field bits, each set comprising a key field bit of predetermined place value from each of said record units.

3. A system as set forth in claim 2, wherein said predetermined place value is the same place value for each of said record units.

4. A system as set forth in claim 3, further comprising timing signal furnishing means furnishing bit time signals; and mode control means interconnected between said timing signal furnishing means and said address transfer means for initiating transfers between said first and second record unit address storage means in response to said bit time signals.

5. A system as set forth in claim 4, wherein said register input means furnish said sets of key field bits in ascending order of place value.

6. A system as set forth in claim 4, wherein said timing signal furnishing means also furnish a plurality of subbit time signals between consecutive ones of said bit time signals; wherein said input means comprise counter means furnishing counter output signals in response to said subbit time signals; and first gating means interconnecting said counter means and said first record unit address storage means.

7. A system as set forth in claim 4, wherein said register addressing means comprise multiplexer means.

8. A system as set forth in claim 4, wherein said mode control means comprise bistable circuit means furnishing a first and second mode control signal in a first and second stable state respectively, and changing from one of said stable states to the other in response to each of said bit time signals.

9. A system as set forth in claim 8, wherein said address transfer means comprise first output gating means having a first input connected to the output of said first record unit address storage means, a second input connected to said mode control means, and an output connected to the input of said second record unit address storage means; and second output gating means having a first input connected to the output of said second record unit address storage means, a second input connected to said mode control means, and an output connected to the input of said first record unit address storage means.

10. A system as set forth in claim 9, wherein said address transfer means further comprise first and second storage location selector means operatively associated with said first and second record unit address storage means respectively, each furnishing a selector output signal enabling a selected storage location in its associated record unit address storage means for read-out or recording, in response to a corresponding mode control signal and a selected keyfield bit.

11. A system as set forth in claim 10, wherein said first storage location selector means comprise "0" address counter means and "1" address counter means, respec-tively furnishing a "0" selector output signal for each record unit address transferred under control of a "0" selected key field bit and a "1" selector output signal for each record unit address transferred under control of a "1" selected key field bit.

12. A system as set forth in claim 11, wherein said "0" address counter means has an enable input, a counting input and a reset input; further comprising "0" counter gating means furnishing an enable signal to said enable input in response to simultaneous occurrence of a "0" selected key field bit and said first mode control signal.

13. A system as set forth in claim 12, wherein said "1" address counter means has an enable input, a counting input, and a reset input; further comprising "1" counter gating means furnishing an enable signal to said enable input in response to simultaneous occurrence of a "1" selected key field bit and said first mode control signal.

14. A system as set forth in claim 13, wherein said "0" counter gating means and said "1" counter gating means each comprise an AND gate.

15. A system as set forth in claim 13, wherein said timing signal furnishing means further furnish a plurality of subbit time signals corresponding in number to said plurality of record unit addresses, between consecutive bit time signals; and means applying said subbit time signals to said counting inputs of said "0" and "1" address counter means.

16. A system as set forth in claim 15, wherein said first storage location selector means further comprise comparator means having a first and second comparator input respectively connected to the output of said "0" and said "1" address counter means, for furnishing a comparator output signal at a comparator output when said "0" selector output signal and said "1" selector output signal have a predetermined relationship.

17. A system as set forth in claim 16, wherein said first storage location selector means further comprise end load gating means for furnishing an "end load" signal in response to simultaneous presence of said first mode control signal and said comparator output signal.

18. A system as set forth in claim 17, further comprising means for furnishing a "read start" signal following in time upon said "end load" signal.

19. A system as set forth in claim 18, wherein said first storage location selector means further comprise "0" reset gating means responsive to the simultaneous presence of a said "read start" signal and said comparator output signal for furnishing a reset signal to said reset input of said "0" address counter means.

20. A system as set forth in claim 19, wherein said first storage location selector means further comprise first and second flip-flop means each having a set and reset output, a set and reset enable input, and a clock input, said second flip-flop means further having a clear direct input; means applying said "read start" signal to said clear direct input and to said set enable input of said first flip-flop means.

21. A system as set forth in claim 20, wherein said first storage location selector means further comprise additional "0" counter gating means furnishing an enable signal to said enable input of said "0" address counter means in response to simultaneous presence of said reset output of said second flip-flop means and said second mode control signal.

22. A system as set forth in claim 21, wherein said first storage selector means further comprise first and second flip-flops and AND gates, each having a first input connected to said set output of said first flip-flop means and a second input connected to the output of said comparator means, said first flip-flop AND gate having an output connected to said set enable input of said second flip-flop means, said second flip-flop AND gate having an output connected to said reset enable input of said second flip-flop means.

23. A system as set forth in claim 22, wherein said first storage selector means further comprise "1" reset gating means responsive to simultaneous presence of said set output of said first flip-flop means, said comparator output signal, and said second mode control signal, and furnishing a reset signal to said reset input of said one address counter means.

24. A system as set forth in claim 23, wherein said first storage location selector means further comprise additional "1" counter gating means for furnishing an enable signal to said enable input of said "1" address counter means in response to simultaneous presence of said second mode control signal and said set output of said second flip-flop means.

25. A system as set forth in claim 13, wherein said first storage location selector means further comprise selection circuit means for selecting a "0" selector output signal to constitute said selector output signal upon occurrence of a "0" counter enable signal, and said "1" selector output signal to constitute said selector output signals upon occurrence of a "1" counter enable signal.

26. A system as set forth in claim 25, wherein said selector circuit means comprise second multiplexer means having a first input connected to the output of said "0" address counter means, a second input connected to the output of said "1" address counter means, a first and second selection input, and a second multiplexer output connected to said first record unit address storage means; and means interconnecting said first and second selection input of said second multiplexer means with the outputs of said "0" counter gating means and said "1" counter gating means, respectively.

27. A system as set forth in claim 1, further comprising first cyclic storage means storing said record units in an arbitrary sequence; read out means operatively associated with said first cyclic storage means; and register input means interconnecting said read out means and said register means for storing in said addressable register storage locations, in sequence, a plurality of sets of record unit bits, each set comprising a corresponding bit from each of said record units.

28. A system as set forth in claim 27, further comprising timing signal furnishing means furnishing bit time signals, and a plurality of subbit time signals corresponding in number to said plurality of record units between consecutive ones of said bit time signals; and wherein said register input means furnish said sets of record unit bits in synchronism with said bit time signals.

29. A system as set forth in claim 28, wherein said first cyclic storage means store said record units in an interlaced pattern; wherein said read-out means comprise a single read-out element; and wherein said register input means comprise serial-parallel converter means.

30. A system as set forth in claim 28, wherein said first cyclic storage means store said record units in a non-interlaced pattern; and wherein said read-out means comprise a plurality of read-out elements corresponding in number to said plurality of record units.

31. A system as set forth in claim 28, further comprising synchronizing means synchronizing said register input means to said first cyclic storage means in such a manner that said plurality of sets of keyfield bits precedes in time all others of said sets of record unit bits.

32. A system as set forth in claim 31 wherein said address transfer means comprise output gating means furnishing selected record unit addresses stored in one of said first and second record unit address storage means in synchronism with said subbit time signals; wherein said register addressing means, responsive to each of said selected record unit addresses address the storage location in said register means corresponding to said selected record unit address, whereby said selected keyfield bit is the keyfield bit of the corresponding record unit; and wherein said address transfer means further comprise means for entering said record unit address into a "0" assigned storage location or a "1" assigned storage location in the other of said record unit storage means in dependence on the value of said selected keyfield bit.

33. A system as set forth in claim 32, wherein said first and second record unit address storage means are non-destructive read-out storage means; further comprising mode control means establishing the direction of transfer between said first and second record unit address storage means; third control means connected to the input of said mode control means for changing said direction of transfer in response to each bit time signal occurring during keyfield read-out time; cyclic output storage means; further comprising data transfer gating means interconnecting said register means and said cyclic output storage means upon receipt of data transfer gating signals; and means for furnishing said data transfer gating signals following in time upon said keyfield read-out time.

34. A computer method for sorting a plurality of record units each having a keyfield, in accordance with the code value of said keyfields, wherein each of said keyfields includes a plurality of keyfield bits arranged in a predetermined keyfield bit order, comprising, in combination, the steps of:

generating a plurality of record unit address signals each accessing a corresponding one of said record units, to form a first address sequence;

processing said first address sequence signals to form a first and second address sub-sequence comprising, respectively, all addresses accessing record units whose first keyfield bit in said predetermined keyfield bit order is "0" and "1";

combining said first and second address subsequences into a second address sequence wherein the members of said first address subsequence precede the members of said second address subsequence;

repeating said steps of processing and combining under control of all remaining keyfield bits to provide a final record unit address sequence; and selectively transferring said record units from a first to a second storage in a single pass in an access sequence controlled by said final address sequence, whereby said record units are stored in said second storage in an ordered sequence according to their relative keyfield values.

35. A computer method for sorting a plurality of record units each having a coded value keyfield, in order of relative keyfield value, comprising the steps of:

a. storing said keyfield bits in a temporary storage having individually accessible storage locations each storing keyfield information relating to a corresponding one of said record units;
b. generating a sequence of address signals to form a first address sequence, each of said address signals being associated with a corresponding one of said keyfield storage locations to provide access thereto, each of said address signals also accessing the record unit containing the keyfield information in the associated storage location;
c. reading the first keyfield bit in said predetermined keyfield bit order of each of said record unit keyfields under sequence control of the associated elements of said first address sequence;
d. processing the signals representing said first address sequence under transfer control of the values of said first keyfield bits to provide first and second address subsequences, comprising respectively all addresses accessing record units whose first keyfield bit is "0" and "1";
e. combining said first and second address subsequences into a second address sequence, wherein the elements of said first address subsequence precede the elements of said second address subsequence;
f. reading the next successive keyfield bit of each of said record units under sequence control of the associated elements of said second address sequence;

g. processing the signals representing said second address sequence under transfer control of the values of said next successive keyfield bits to provide third and fourth address subsequences, comprising respectively, all addresses accessing record units wherein said next successive keyfield bit is "0" and "1";

h. combining said third and fourth address subsequences into a third address sequence wherein the elements of said third address subsequence precede the elements of said fourth address subsequence;

i. repeating said steps of reading corresponding successive keyfield bits of each of said record units under sequence control of the previous address sequence, processing said previous address sequence under transfer control of said keyfield bit values to form two subsequences therefrom and combining said two subsequences to form a new address sequence, under control of all remaining keyfield bit positions until a final address sequence is obtained; and j. selectively transferring said record units in one pass from a first to a second storage in an access sequence controlled by said final address sequence.

36. A method for sorting a plurality of record units each having a keyfield in order of ascending keyfield value wherein each of said keyfields includes a plurality of keyfield bits arranged in a predetermined keyfield bit order to collectively form said value, comprising the steps of:

a. storing the low order bit of each of said keyfields in selectively addressable storage locations within a holding register;

b. generating a first sequence of address signals;

c. associating each of said address signals with a corresponding one of said storage locations, said address signals accessing the entire record unit of which the keyfield bit in the associated storage location is a part;

d. interrogating each of said low order keyfield bits in a sequence controlled by said first address sequence;

e. processing said first address sequence signals under transfer control of said sequentially interrogated low order keyfield bits to provide a first address subsequence including all addresses accessing record units whose low order keyfield bit is "0" and a second address subsequence including all addresses accessing record units whose low order keyfield bit is "1";

f. combining said first and second address subsequences to form a second address sequence, wherein the elements of said first address subsequence precede the elements of said second address subsequence;

g. storing the next higher keyfield bit of each of said keyfields in the same holding register storage locations which held the low order keyfield bit of the same keyfield;

h. interrogating each of said next higher keyfield bits in a sequence controlled by said second address sequence;

i. processing said second address sequence under control of said sequentially interrogated next higher keyfield bits to provide a third address subsequence including all addresses accessing record units whose said next higher keyfield bit is a "0" and a fourth address subsequence including all addresses accessing record units whose said next higher keyfield bit is a "1";

j. combining said third and fourth address subsequences to form a third address sequence wherein the elements of said third address subsequence precede the elements of said fourth address subsequence;

k. repeating said steps of storing the next higher keyfield bits, interrogating them in a sequence controlled by the previously combined address sequence and processing said previously combined address sequence under transfer control of said sequentially interrogated keyfield bits to form two new address subsequences which are then combined to form a new address sequence, until the high order keyfield bit of each of said record units has been interrogated and a final address sequence has been produced;

l. selectively transferring said record units from a first random access storage to a second data storage in an access sequence controlled by said final address sequence, whereby said record units are stored on said second data storage in sequence of ascending keyfield value.

37. The method of claim 36 wherein the step of processing a previously combined address sequence to form two new address subsequences is accomplished by transferring an address of said sequence to consecutively addressable storage locations within a first storage area if the associated keyfield bit being interrogated is a "0" and to consecutively addressable storage locations within a second storage area if the associated keyfield bit being interrogated is a "1".

38. The method of claim 37 wherein the step of combining said address subsequences to form a new address sequence is accomplished by consecutively reading out the contents of said first storage area followed by said second storage area.

39. The method of claim 38 wherein said new address sequence is processed to form two subsequences by transferring particular elements of said new sequence to consecutive storage locations within a third storage area if the associated keyfield bit being then interrogated is a "0" and to consecutive storage locations within a fourth storage area if the associated keyfield bit being then interrogated is a "1".

40. The method of claim 39 wherein address sequence elements are repeatedly transferred between said first and second storage areas on the one hand and said third and fourth storage areas on the other hand under control of the values of successively higher corresponding keyfield bits until the highest order bit of each keyfield has been interrogated and a final combined address sequence is formed on the basis of said interrogation.

41. The method of claim 40 wherein the step of selectively transferring said record units from said random access storage to said data storage further comprises the steps of successively storing the bits of corresponding position from each of said record units in the same holding register storage locations in which the associated keyfield bits were held and selectively accessing said storage locations for readout to said second data storage in a sequence controlled by said final address sequence.

42. The method of claim 41 wherein said record units are initially stored in a cyclic magnetic storage in sequential order and non-interlaced format and wherein keyfield bits of corresponding significance are stored in said holding register storage locations by sequential transfer of said bits from said cyclic storage to a serial to parallel converter whose outputs are connected in parallel to said holding register storage locations.

43. The method of claim 41 wherein said record units are initially stored in a cyclic magnetic storage in interlaced format and wherein keyfield bits of corresponding significance are stored in said holding register storage locations by parallel transfer of said bits from said cyclic storage through a plurality of spaced transducing means associated with said cyclic storage.

44. The method of claim 41 wherein said second data storage is a cyclic magnetic storage.

* * * * *